United States Patent
Formanek

(10) Patent No.: US 6,263,037 B1
(45) Date of Patent: Jul. 17, 2001

(54) CUTTING ZONE FOR RADIOACTIVE MATERIALS

(75) Inventor: Frank Joseph Formanek, W. Suffield, CT (US)

(73) Assignee: CE Nuclear Power LLC, Windsor, CT (US)

( * ) Notice: Subject to any disclaimer, the term of this patent is extended or adjusted under 35 U.S.C. 154(b) by 0 days.

(21) Appl. No.: 09/264,241

(22) Filed: Mar. 8, 1999

Related U.S. Application Data

(60) Provisional application No. 60/095,856, filed on Aug. 7, 1998.

(51) Int. Cl.[7] .................................................. G21C 19/00
(52) U.S. Cl. ......................... 376/260; 376/249; 376/263; 376/287
(58) Field of Search ..................... 376/260–265, 376/249, 287, 288

(56) References Cited

U.S. PATENT DOCUMENTS

| | | | | |
|---|---|---|---|---|
| 3,610,194 | * | 10/1971 | Siegel | 114/0.5 |
| 3,629,875 | * | 12/1971 | Dow | 4/146 |
| 3,868,824 | * | 3/1975 | Thurman | 61/1 F |
| 4,047,390 | * | 9/1977 | Boyce, II | 61/69 R |
| 4,056,435 | * | 11/1977 | Carlier et al. | 176/30 |
| 4,069,923 | * | 1/1978 | Blumenau et al. | 214/17 B |
| 4,641,400 | * | 2/1987 | Moreland | 24/389 |
| 4,675,923 | * | 6/1987 | Ashley | 4/599 |
| 4,707,334 | * | 11/1987 | Gerhard | 422/28 |
| 4,934,763 | * | 6/1990 | Jacobons | 312/1 |
| 5,001,870 | | 3/1991 | Yokota et al. | 51/410 |
| 5,236,506 | * | 8/1993 | Mazakas | 118/634 |
| 5,239,564 | * | 8/1993 | Jacquier et al. | 376/260 |
| 5,342,121 | * | 8/1994 | Koria | 312/1 |
| 5,607,353 | * | 3/1997 | Hutchings et al. | 454/187 |
| 5,637,029 | | 6/1997 | Lehane | 451/39 |

FOREIGN PATENT DOCUMENTS

| | | | |
|---|---|---|---|
| 2411364 | * | 9/1975 | (DE). |
| 63-16016 | | 11/1998 | (JP). |

* cited by examiner

Primary Examiner—Charles T. Jordan
Assistant Examiner—Jack Keith
(74) Attorney, Agent, or Firm—Ronald P. Kananen; Rader, Fishman & Grauer

(57) ABSTRACT

An enclosed cutting zone for use in a nuclear power plant. The cutting zone includes a cutting zone barrier and a transfer zone. The cutting zone includes a movable submergible upper rig, an upper inflatable ring supported by the submergible rig; a lower inflatable ring supported by the submergible rig; and a means for coupling the vertically extending edges of the submergible upper rig to form a cutting zone barrier having enclosed sidewalls. The transfer zone includes a movable, submergible upper rig; an upper inflatable ring supported by the submergible rig; and a lower inflatable ring supported by the submergible rig. The transfer zone is coupled to exterior surface of the cutting barrier so as to form a structure having enclosed sidewalls and an open top.

11 Claims, 1 Drawing Sheet

CUTTING ZONE FOR RADIOACTIVE MATERIALS

CROSS REFERENCE TO RELATED APPLICATION

This application is related to and claims the benefit of U.S. Provisional Application No. 60/095,856, filed Aug. 7, 1998.

FIELD OF THE INVENTION

The present invention relates to a cutting zone for use in a nuclear power plant. More specifically, the invention relates to a cutting zone barrier that isolates the cutting zone from the entire pool cavity to reduce the spread of microscopic radioactive particles.

BACKGROUND OF THE INVENTION

Over the life of a nuclear power plant, various power plant internals will need to be decommissioned. During the decommissioning process, the components being deconmmissioned are generally cut-up into smaller segments to facilitate removal and storage. When the retired components are being cut-up, microscopic radioactive particles are produced. To reduce the amount of airborne particles, the cutting process is often carried out in the reactor pool cavity. Consequently, the microscopic particles generated become suspended in the water cavity. However, these particles can be spread throughout the power plant through the water cavity, causing increased exposure to personnel or additional contamination to the nuclear utility.

Thus, there is needed a cutting zone barrier that isolates the cutting zone from the entire pool cavity to reduce the spread of unwanted contamination.

SUMMARY OF THE INVENTION

The present invention is directed to an enclosed cutting zone for use in a nuclear power plant. The cutting zone includes a cutting zone barrier and a transfer zone. The barrier zone includes a movable, submergible upper rig, an upper inflatable ring supported by the submergible rig; a lower inflatable ring supported by the submergible rig; and a means for coupling the vertically extending edges of the submergible upper rig to form a barrier zone having enclosed sidewalls and an open top and bottom.

The means for coupling the ends of the submergible rig is a zipper, wherein the zipper is formed of plastic and includes two rows of interlocking teeth. Alternatively, the zipper is formed of plastic and includes a recessed channel sized to receive an outwardly protruding ridge. In this form, the zipper is closed by inserting the protruding ridge into the recessed channel. The zipper is supported by the submergible rig in a location between the cutting zone and the transfer zone so as to permit access to the transfer zone upon opening the zipper.

The transfer zone includes a movable, submergible upper rig; an upper inflatable ring supported by the submergible rig; and a lower inflatable ring supported by the submergible rig. The transfer zone is coupled to exterior surface of the barrier zone so as to form a structure having enclosed sidewalls and an open top.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF PREFERRED EMBODIMENTS

Figure 1:
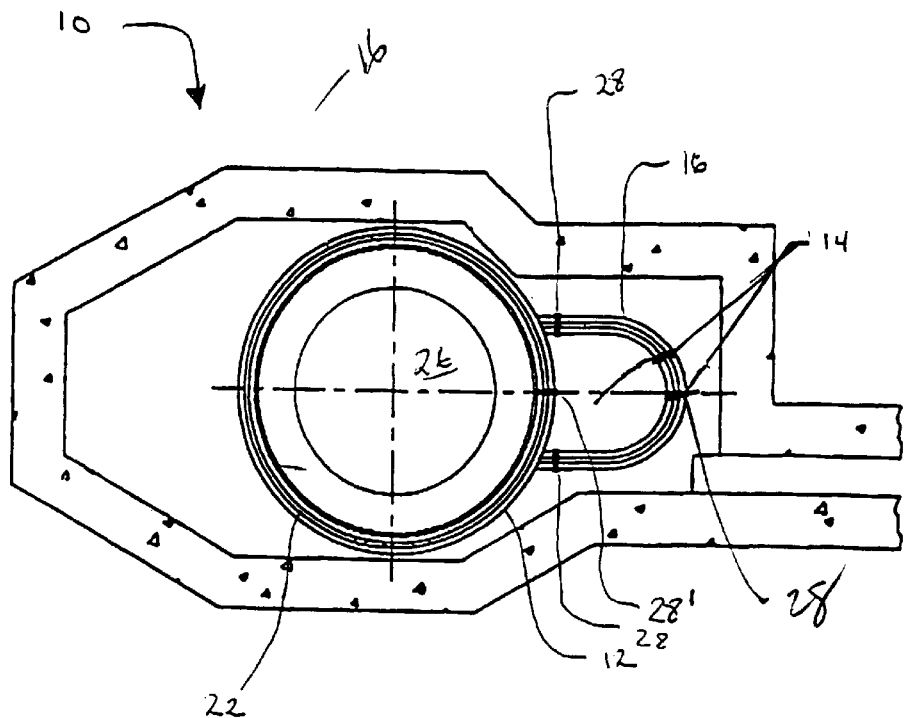
FIG. 1 is top view of a cutting zone formed in accordance with the teachings of this invention.

FIG. 1 shows a cutting zone 10 formed in accordance with the teachings of this invention. In the described embodiment, the cutting zone 10 is placed in a reactor pool cavity of a nuclear power plant, and provides a barrier for isolating radioactive material generated during the decommissioning or repair of various reactor equipment or components. The cutting zone 10 includes a cutting zone barrier 12 and an isolated transfer zone 14. The cutting zone barrier 12 and the transfer zone 14 include several common elements. It will be understood that common reference numerals are used to describe common features of the embodiment of the cutting zone shown in FIGS. 1–2.

The cutting zone barrier 12 includes a submergible upper rig 16, an inflatable upper ring 22 and an inflatable lower ring 24. The submergible upper rig 16 is a plastic, submergible curtain. In the preferred embodiment, the submergible upper rig 16 is fabricated of polyurethane, the polyurethane being of a type that can be disposed of by insinuation.

The submergible rig 16 is installed in the reactor pool cavity from the bottom-up. Typically, the submergible rig 16 is installed remotely using tools and techniques known in the industry. As the installation normally takes place under water, the submergible rig 16 is rolled into a tube-like shape and lowered into the pool cavity. During the installation process, the lower portion 18 of the submergible rig 16 is coupled to an anchor support 30. Preferably, the anchor support 30 is coupled to the support superstructure forming the pool cavity. In the embodiment described, the anchor support 30 includes a slot 32 in the top surface 34. The slot 32 receives the lower portion 18 of the submergible rig 16.

The lower portion 18 of the submergible rig 16 supports an inflatable lower ring 24. The lower inflatable ring 24 is integrally formed with the submergible rig 16. The lower inflatable ring 24 may be constructed as one continuous ring surrounding the entire perimeter of the lower portion 18 or as a plurality of individual inflatable rings. In the preferred embodiment, the lower inflatable ring 24 is one continuous ring.

Once the lower portion 18 is coupled to the anchor support 30, the lower inflatable ring 24 is filled with water. A hose (not shown) is coupled to the lower ring 24, and the lower ring 24 is filled with water. As the lower ring 24 fills with water, the lower ring 24 expands, locking the lower ring 24 in position in the anchor support 30.

The submergible rig 16, at the upper end 20, supports an upper inflatable ring 22. Preferably, the upper inflatable ring 22 is integrally formed with the submergible rig 16. The upper ring 22 may be one continuous ring surrounding the upper perimeter of the submergible rig 16 or a plurality of individual inflatable rings. In the preferred embodiment, the upper inflatable ring 22 is one continuous ring.

The upper inflatable ring 22 is coupled to a source of air pressure (not shown) and inflated. The upper ring 22 is sized appropriately to cause the submergible rig 16 to float to the top of the reactor pool cavity upon filling the upper ring 22 with air. By appropriately inflating or deflating the upper ring 22, the submergible rig 16 may be raised or lowered as necessary.

The left and right ends of the submergible rig 16 are coupled together to form a cutting area 26 having enclosed sidewalls and an open top. In the preferred embodiment, a zipper 28 couples the left and rights sides of the submergible rig 16 together. The zipper 28 is fabricated of a plastic material, wherein the zipper 28 includes two rows of interlocking teeth forced together or apart by a movable guide. Alternatively, the zipper 28 includes a recessed channel, which receives a mating outwardly projecting ridge supported by the other half of the zipper 28. To close the zipper 28, the outwardly projecting ridge is inserted into the recessed channel.

The submergible rig 16 also supports a second isolated zone, which forms the transfer zone 14. The transfer zone 14 may be integrally formed with the submergible rig 16 or coupled thereto using a plurality of the zippers 28. The transfer zone 14 is coupled to the exterior perimeter of the cutting zone barrier 12 so as to form a structure having enclosed sidewalls and an open top.

The transfer zone 14 includes a submergible rig 16 supporting upper and lower inflatable rings 22, 24. The transfer zone submergible rig 16 is installed in the manner previously described for the cutting zone barrier 12. To secure the transfer zone 14 submergible rig 16 in place, the submergible rig 16 is coupled to the lower support 30 as previously described. The lower inflatable ring 24 is filled with water, locking the lower portion 18 of the submergible rig 16 to the support 30. The upper ring 20 is inflated with air. As the upper ring 20 is inflated with air, the transfer zone 14 submergible rig 16 floats to the top of the reactor pool.

Figure 2:
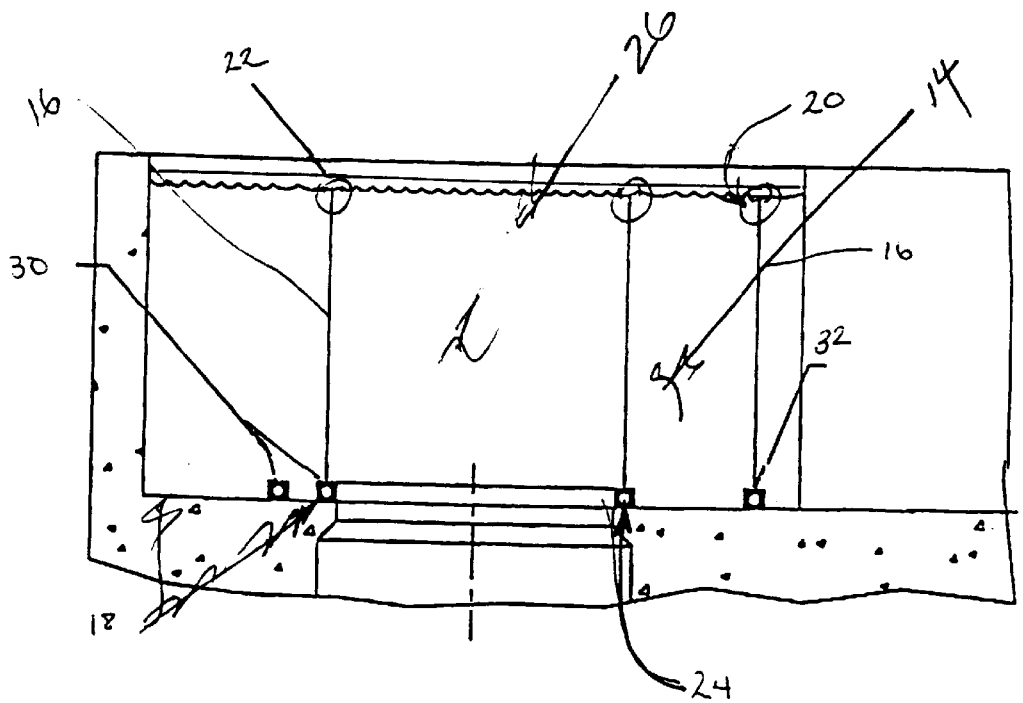
FIG. 2 is an elevational view of the cutting zone shown in FIG. 1.

In the preferred embodiment, the zipper 28' provides access to the transfer zone 14 from the cutting zone 26. As shown in FIG. 2, the zipper 28' is located on the cutting zone barrier 12 submergible rig 16 at a location between the cutting zone barrier 12 and the transfer zone 14. Consequently, once the cutting operation is completed, the zipper 28' is opened, and the part being decommissioned is transferred to the transfer zone for disposal.

A preferred embodiment of the present invention has been disclosed. A person of ordinary skill in the art would realize, however, that certain modifications would come within the teachings of this invention. Therefore, the following claims should be studied to determine the true scope and content of the invention.

What is claimed is:

1. An enclosed cutting zone for use in a nuclear power plant, comprising:
    a cutting zone barrier, comprising:
        a moveable, cutting zone barrier submergible rig;
        an upper inflatable ring supported by the cutting zone barrier submergible rig;
        a lower inflatable ring supported by the cutting zone barrier submergible rig;
    a zipper coupling vertically extending edges of the cutting zone barrier submergible rig;
    a transfer zone, comprising:
        a movable, transfer zone submergible rig, wherein the vertically extending edges are supported by the cutting zone barrier submergible rig;
        an upper inflatable ring supported by the transfer zone submergible rig; and
        a lower inflatable ring supported by the transfer zone submergible ring.

2. The cutting zone as defined in claim 1, wherein the zipper is formed of plastic and includes two rows of interlocking teeth.

3. The cutting zone as defined in claim 1, wherein the zipper is plastic and includes a recessed channel sized to receive an outwardly protruding ridge.

4. The cutting zone as defined in claim 1, wherein the zipper is supported by the cutting zone barrier submergible rig so as to permit access to the transfer zone upon opening the zipper.

5. The cutting zone as defined in claim 1, wherein the upper inflatable ring is integrally formed with the cutting barrier submergible rig.

6. The cutting zone as defined in claim 1, wherein the upper inflatable ring is filled with air.

7. The cutting zone as defined in claim 1, wherein the lower inflatable ring is integrally formed with the cutting barrier submergible rig.

8. The cutting zone as defined in claim 1, wherein the lower inflatable ring is filled with water.

9. The cutting zone as defined in claim 1, wherein the lower portion of the cutting barrier submergible rig is coupled to a lower support.

10. The cutting zone as defined in claim 1, wherein the cutting zone is installed in a nuclear power plant reactor pool cavity.

11. An enclosed cutting zone for use in a nuclear power plant, comprising:
    a cutting zone barrier, comprising:
        a movable, submergible upper rig;
        an upper inflatable ring supported by the submergible rig;
        a lower inflatable ring supported by the submergible rig;
    a zipper coupling the vertically extending edges of the submergible upper rig to form an enclosed barrier zone;
    a transfer zone integrally formed with and supported by the exterior surface of the cutting barrier submergible rig, comprising:
        a movable, transfer zone submergible upper rig;
        an upper inflatable ring supported by the transfer zone submergible rig; and
        a lower inflatable ring supported by the transfer zone submergible rig.

* * * * *